(12) United States Patent
Koguchi et al.

(10) Patent No.: US 8,397,558 B2
(45) Date of Patent: Mar. 19, 2013

(54) METHOD AND APPARATUS FOR MEASURING TIRE PERFORMANCE

(75) Inventors: Noritaka Koguchi, Kanagawa (JP); Shogo Sarumaru, Hyogo (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 89 days.

(21) Appl. No.: 13/178,979

(22) Filed: Jul. 8, 2011

(65) Prior Publication Data
US 2012/0048006 A1   Mar. 1, 2012

(30) Foreign Application Priority Data
Sep. 1, 2010   (JP) .................................. 2010-196129

(51) Int. Cl.
*G01M 17/02* (2006.01)
(52) U.S. Cl. .......................................... 73/146
(58) Field of Classification Search .................. None
See application file for complete search history.

(56) References Cited

U.S. PATENT DOCUMENTS

| | | | |
|---|---|---|---|
| 4,907,447 A | | 3/1990 | Tanaka et al. |
| 5,088,321 A | * | 2/1992 | Kajikawa et al. ............... 73/146 |
| 5,245,867 A | * | 9/1993 | Sube et al. ....................... 73/146 |
| 5,485,406 A | * | 1/1996 | Wada et al. .................... 702/167 |
| 5,724,128 A | * | 3/1998 | January ..................... 356/139.09 |
| 5,789,668 A | * | 8/1998 | Coe et al. .......................... 73/146 |
| 6,439,042 B1 | | 8/2002 | Delmoro et al. |
| 6,609,417 B1 | * | 8/2003 | Cantu et al. ...................... 73/146 |
| 6,802,130 B2 | * | 10/2004 | Podbielski et al. .............. 33/288 |
| 7,469,579 B2 | * | 12/2008 | Iwase et al. ...................... 73/146 |
| 7,578,180 B2 | * | 8/2009 | Lionetti et al. ................... 73/146 |
| 8,196,462 B2 | * | 6/2012 | Stalnaker et al. ................ 73/146 |

FOREIGN PATENT DOCUMENTS

JP    03-078636    4/1991

OTHER PUBLICATIONS

Extended European Search Report issued in corresponding EP App. No. 11 17 6259, dated Dec. 19, 2011.

* cited by examiner

*Primary Examiner* — Lisa Caputo
*Assistant Examiner* — Jermaine Jenkins
(74) *Attorney, Agent, or Firm* — Greer, Burns & Crain, Ltd.

(57) ABSTRACT

At least one of ground contact pressure, shear stress and amount of skidding is measured at a measurement point on a tread surface of a tire. A sensor is arranged on a road surface and the measurement point is made to contact the sensor while the tire rotates. An initial position of the tire is set, where the measurement point is at a previously-set reference position and the tire is at a running start position on the road surface. The tire is made to run from the initial position to obtain a rotation angle difference θ between a tire rotation angle until the rotation axis of the tire passes over the arrangement position of the sensor and a tire rotation angle until the measurement point contacts the road surface. The tire is set at the initial position and rotated by θ without changing the running start position of the tire.

4 Claims, 5 Drawing Sheets

METHOD AND APPARATUS FOR MEASURING TIRE PERFORMANCE

CROSS-REFERENCE TO RELATED APPLICATIONS

This application is based upon and claims the benefit of priority from Japanese Patent Application No. 2010-196129, filed Sep. 1, 2010, the entire contents of which are incorporated herein by reference.

BACKGROUND OF THE INVENTION

1. Field of the Invention

The present invention relates to a method for measuring at least one of ground contact pressure, shear stress, and an amount of skidding of a tire.

2. Description of the Related Art

Conventionally, for evaluating the performance of a tread surface of the tire, the ground contact pressure, shear stress, and amount of skidding of the tire are measured. For the measurement, a measurement point is set on the tread surface of the tire and the tire is made to roll on a flat, measuring board under a predetermined condition. The measurement point on the tread surface is made to contact with a sensor embedded in the flat board. Before actual measurement, an alignment process is performed. In the alignment process, the measurement point on the tire tread surface is made to perfectly coincide with the position of the sensor arranged on the flat board. One known example of the alignment process is described in Japanese Patent Application Laid-Open No. H3-78636 which discloses a method for measuring the ground contact pressure of the tire.

According to the method disclosed in Japanese Patent Application Laid-Open No. H3-78636, a tread surface of a tire is marked with a chalk or a colorant to indicate the position of a measurement point. Then, the tire is placed at the running start position on the flat board. In the middle of the flat board, a measurement plate is arranged movable with respect to the flat board. A pressure sensor is embedded in the measurement plate at the center thereof to detect the ground contact pressure of the tire. The tire is made to undergo preliminary running from the running start position toward the measurement plate, thus, the mark of the measurement point on the tire is transferred to the measurement plate. The misalignment between the position of the pressure sensor and the position where the mark of measurement point is transferred is read in terms of X coordinate and Y coordinate. Here, X direction refers to a running direction of the tire, and Y direction is a direction perpendicular to the X direction (i.e., a direction parallel to the rotation axis of the tire). After placed at the running start position again, the tire is moved in X direction by a shift amount Δx, and the measurement plate is moved in the Y direction by a shift amount Δy. Thus, the misalignment is corrected. Thereafter, the tire is made to undergo main running towards the measurement plate and the ground contact pressure is measured.

When the method of Japanese Patent Application Laid-Open No. H3-78636 is employed, the running start position of the tire is moved by shift amount Δx in the X direction before the main running. Hence, the running distance between the running start position and the pressure sensor changes in the main running from that in the preliminary running. Therefore, even though the misalignment of the tire in the X direction is corrected, the measurement point does not always reach the position of the sensor depending on the influence of the driving/braking force applied to the tire, and errors occur, resulting in low reproducibility.

SUMMARY OF THE INVENTION

A tire performance measurement method according to one aspect of the present invention is a tire performance measurement method for detecting at least one of ground contact pressure, shear stress and amount of skidding at a measurement point on a tread surface of a tire by a sensor by rotating the tire on a road surface and causing the measurement point to contact the sensor arranged on the road surface, and the method includes: setting an initial position of the tire, the initial position being a position where the measurement point is at a previously-set reference position and the tire is at a running start position on the road surface; causing the tire to run from the initial position to obtain a rotation angle difference θ between a tire rotation angle by which the tire rotates until the rotation axis of the tire passes over the arrangement position of the sensor and a tire rotation angle by which the tire rotates until the measurement point contacts the road surface; and setting the tire at the initial position again to rotate the tire by the angle θ without changing the running start position of the tire, and causing the tire to run from the set state to measure at least one of the ground contact pressure, shear stress, and amount of skidding.

A tire performance measurement method according to another aspect of the present invention is a tire performance measurement method for detecting at least one of ground contact pressure, shear stress, and amount of skidding at a plurality of measurement points on a tread surface of a tire by a sensor by rotating the tire on a road surface and causing the plurality of measurement points to contact the sensor arranged on the road surface, and the method includes: a first step of setting an initial position of the tire, the initial position being a position where a first measurement point among the plurality of measurement points is at a previously-set reference position and the tire is at a running start position on the road surface; a second step of causing the tire to run from the initial position to obtain a rotation angle difference θ between a tire rotation angle by which the tire rotates until the rotation axis of the tire passes over the arrangement position of the sensor and a tire rotation angle by which the tire rotates until the first measurement point contacts the road surface; a third step of setting the tire at the initial position again to rotate the tire by the angle θ without changing the running start position of the tire, and causing the tire to run from the set state to measure at least one of the ground contact pressure, shear stress, and amount of skidding with respect to the first measurement point; and a fourth step of setting the tire at the initial position again, rotating the tire by an angle θ-β without changing the running start position of the tire, β being an angle corresponding to an interval x in a tire circumferential direction between the first measurement point and another measurement point among the plurality of measurement points, and causing the tire to run from this state to measure at least one of the ground contact pressure, shear stress and skidding amount with respect to the another measurement point, wherein the fourth step is performed with respect to all the measurement points other than the first measurement point.

A tire performance measurement apparatus according to still another aspect of the present invention is a tire performance measurement apparatus for detecting at least one of ground contact pressure, shear stress, and amount of skidding at a measurement point on a tread surface of a tire by a sensor arranged on a road surface by causing the tire to rotate on the road surface to cause the measurement point to contact the sensor, and the apparatus includes: a control unit that sets an initial position of the tire, the initial position being a position where the measurement point is at a previously-set reference position and the tire is at a running start position on the road surface; a rotation-angle-difference calculating unit that obtains a rotation angle difference θ between a tire rotation angle by which the tire rotates when running from an initial position until a rotation axis of the tire passes over an arrangement position of the sensor and a tire rotation angle by which the tire rotates when running from the initial position until the measurement point contacts the road surface; and a rotation mechanism that rotates the tire by the angle θ without changing the running start position of the tire arranged at the initial position, wherein the at least one of the ground contact pressure, shear stress and the amount of skidding is measured by causing the tire to run from the state after the tire is rotated by the rotation mechanism The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a tire performance measurement method and a tire performance measurement apparatus according to the present invention are described in detail below with reference to the accompanying drawings. The embodiments described below do not limit the present invention. Constituent elements of the embodiment described below may include those replaceable or easily conceivable by those skilled in the art, or those substantially equivalent to them. Though the tire performance measurement method and the tire performance measurement apparatus according to the present invention can be applied to measure the ground contact pressure, shear stress, and amount of skidding of the tire, measurement of ground contact pressure will be described below by way of example.

Figure 1:
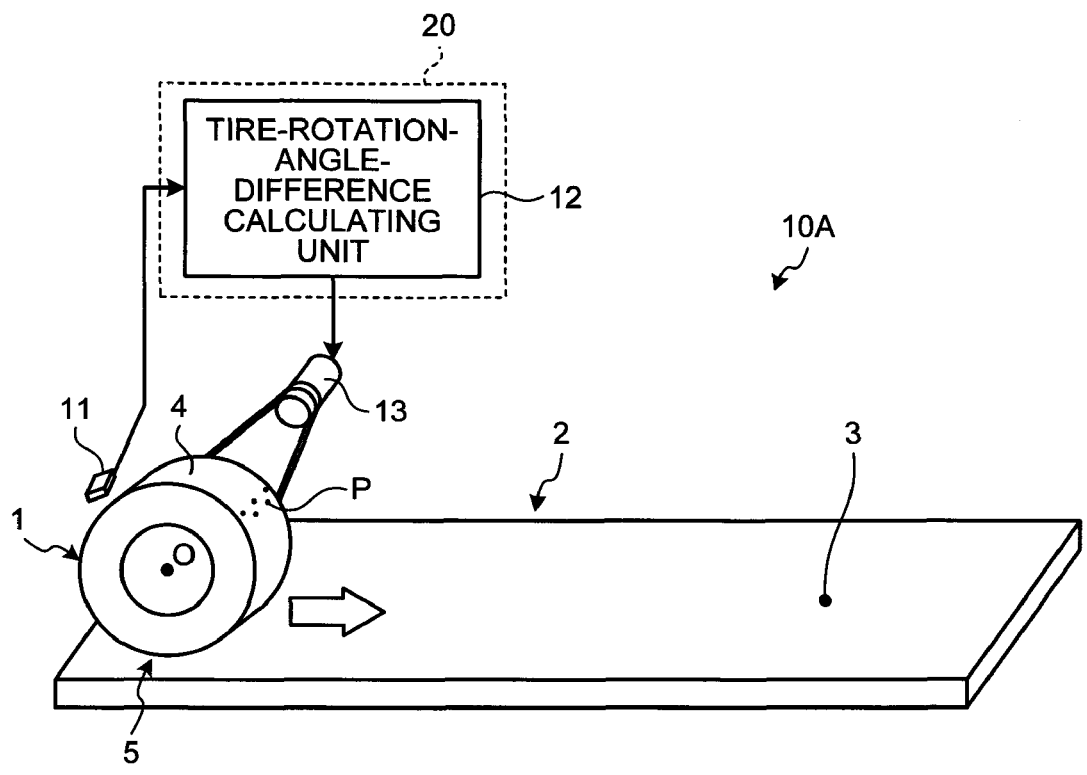
FIG. 1 is a schematic view of a tire performance measurement apparatus according to an embodiment.

FIG. 1 is a schematic diagram of a tire performance measurement apparatus 10A adopting a tire performance measurement method according to an embodiment of the present invention. The tire performance measurement apparatus 10A illustrated in FIG. 1 includes a flat running board (road surface) 2 having a predetermined length to allow the rolling (i.e., running) of a tire 1, a pressure sensor 3 that is embedded in the middle of the flat running board 2 to detect the ground contact pressure of the tire 1, and a tire running device (not shown) that causes the tire 1 to run on the flat running board 2. The tire performance measurement apparatus 10A is configured to measure the ground contact pressure applied on a measurement point P using the pressure sensor 3 by causing the tire 1 arranged at a running start position 5 to run on the flat running board 2 while applying a predetermined load on the tire 1 and making the measurement point P on a tread surface 4 to contact the pressure sensor 3 arranged on the flat running board 2. Hereinbelow, a direction along the longitudinal direction of the flat running board 2, i.e., a running direction of the tire is referred to as "X direction", and a direction perpendicular to the X direction, i.e., a direction parallel to the rotation axis of the tire is referred to as "Y direction".

To measure the ground contact pressure applied on the measurement point P of the tire 1 using the tire performance measurement apparatus 10A, the ground contact position of the measurement point P must be matched with the position of the pressure sensor 3 to ensure the contact between the measurement point P and the pressure sensor 3 during the running of the tire 1.

Figure 2:
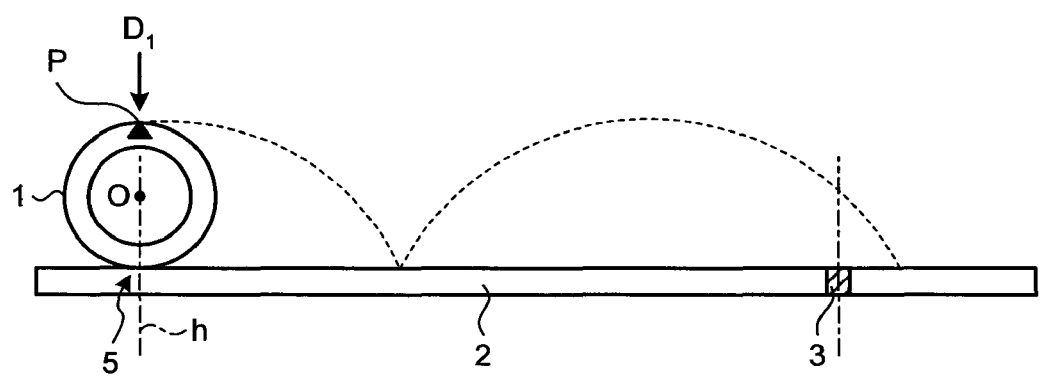
FIG. 2 is a diagram illustrating a trajectory of a measurement point during the rolling of the tire from a running start position to an arrangement position of a pressure sensor.

FIG. 2 illustrates a trajectory of the measurement point P during the running of the tire 1 from the running start position (a predetermined position in the X direction) 5 to the arrangement position of the pressure sensor 3. Reference position $D_1$ is set close to the surface of the tire 1 in order to specify an angle around a rotation axis O of the tire 1 set at the running start position 5. For example, in FIG. 2, the reference position $D_1$ is set on a line h connecting the running start position 5 and the rotation axis O. The tire 1 is set at the running start position 5 such that the measurement point P coincides with the reference position $D_1$. Hereinbelow, the position of the tire 1 set in this state is referred to as "initial position". The distance between the tire 1 at the initial position and the pressure sensor 3 is set based on the estimated trajectory of the measurement point P. The trajectory is estimated in advance based on the radius or the like of the tire 1. The trajectory of the measurement point P up to the pressure sensor 3 is set to one and a half the length of rotation of the tire 1 as illustrated in FIG. 2.

However, even when the distance between the tire 1 at the initial position and the pressure sensor 3 is adjusted based on the estimated trajectory of the measurement point P and the tire 1 is made to rotate from the initial position, the measurement point P does not coincide with the position of the pressure sensor 3 as illustrated in FIG. 2 and lands on a position a predetermined distance away from the arrangement position of the pressure sensor 3. When the tire 1 is actually made to run, the radius of the tire 1 changes slightly depending on the conditions such as the applied load and the driving/braking force. This change is the cause of the error. In the present embodiment, a preliminary measurement is performed as described below before the main measurement of the ground contact pressure of the tire 1 in order to correct the position of the measurement point P at the start of the tire 1 rolling. Hereinbelow, this correction is referred to as correction of rotation starting position of the measurement point P.

Figure 3A:
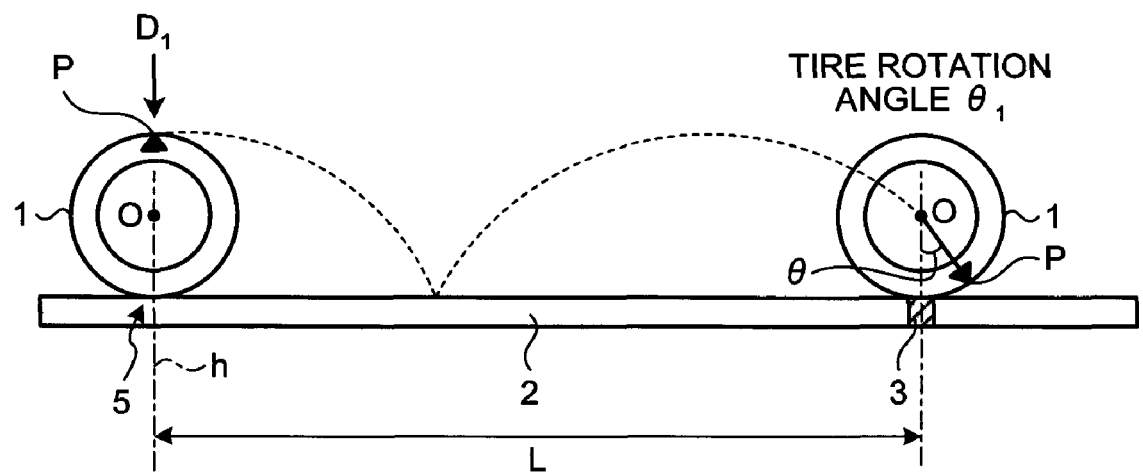
FIGS. 3A and 3B are diagrams for conceptually illustrating a preliminary measurement.
Figure 3B:
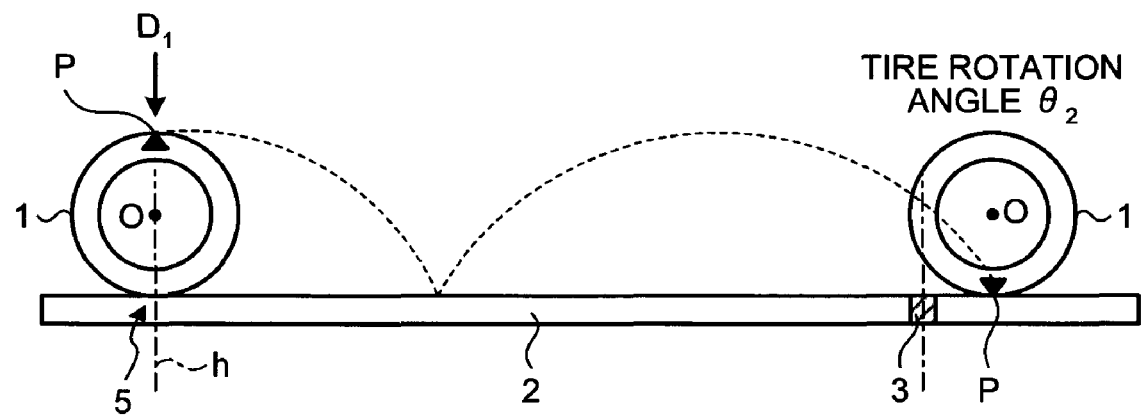

FIGS. 3A and 3B are conceptual diagrams of the preliminary measurement. Firstly, the measurement point P on the tread surface 4 of the tire 1 (see FIG. 1) is identified. The measurement point P is marked with a chalk or the like as necessary. Then, the tire 1 is arranged at the initial position as illustrated in FIG. 3A. In FIG. 3A, the reference position $D_1$ is set on the straight line h in the same manner as in FIG. 2.

Distance from the running start position 5 to the arrangement position of the pressure sensor 3 is represented as L. Then, the tire 1 is made to run from the initial position. When the rotation axis O of the tire 1 passes directly above the pressure sensor 3, an angle θ is formed by the line connecting the contact point of the tire 1 and the flat running board 2 and the rotation axis O and the line connecting the measurement point P and the rotation axis O. This angle θ is represented by positive value in anticlockwise direction in FIG. 3A.

In an example illustrated in FIGS. 3A and 3B, the measurement point P lands on a position beyond the arrangement position of the pressure sensor 3 (in other words, a linear distance between the running start position 5 and the measurement point P is longer than the distance L between the running start position 5 and the pressure sensor 3). When the measurement point P lands in front of the position of the pressure sensor 3 (in other words, when the linear distance between the running start position 5 and the measurement point P is shorter than the distance L between the running start position 5 and the pressure sensor 3), the angle θ is represented by a negative value.

A manner of obtaining the angle θ illustrated in FIG. 3A is not particularly limited. One exemplary manner is to utilize a tire-rotation-angle sensor 11 illustrated in FIG. 1. Firstly, the tire 1 is made to run from the initial position. When the rotation axis O of the tire 1 passes over the pressure sensor 3 as illustrated in FIG. 3A, tire rotation angle is $\theta_1$, and when the measurement point P lands on the flat running board 2 as illustrated in FIG. 3B, tire rotation angle is $\theta_2$. The angle θ is obtained as difference $\theta_2$-$\theta_1$. Hereinbelow, the angle θ is referred to as rotation angle difference θ.

Figure 4:
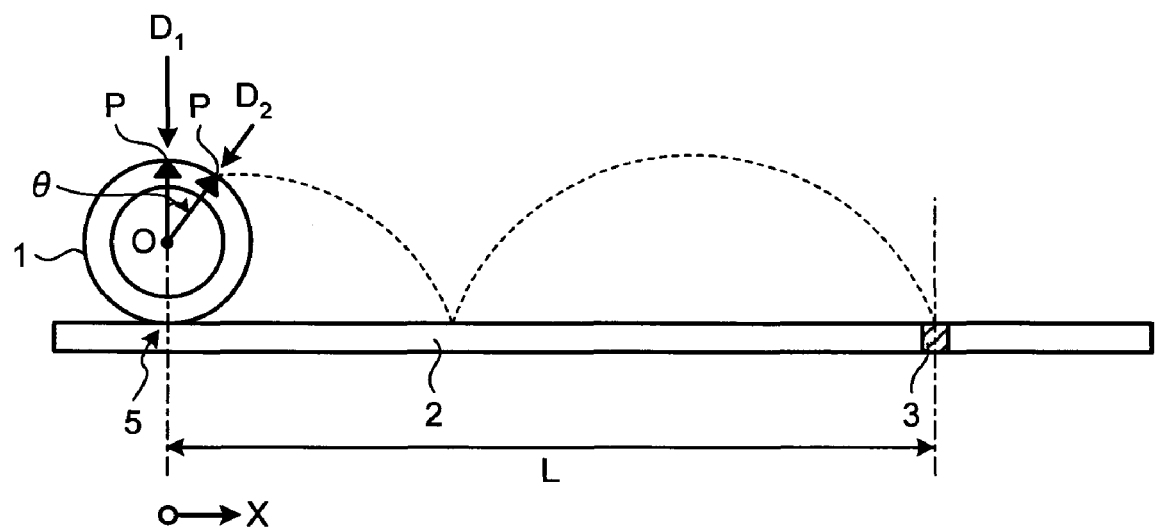
FIG. 4 is a diagram conceptually illustrating a correction of position of a measurement point.

After the preliminary measurement, the tire 1 is brought back to the initial position, and the rotation start position of the measurement point P is corrected. FIG. 4 is a conceptual diagram of the correction of the rotation start position of the measurement point P. As illustrated in FIG. 4, the tire 1 is arranged at the initial position. Then, without changing the position of the tire 1 in the X direction, the tire 1 is made to rotate by the rotation angle difference θ around the rotation axis O, the clockwise direction being the positive direction. Thus, the measurement point P of the tire 1 is moved to position $D_2$ which is the angle θ forward from the reference position $D_1$. Thus, though the rotation start position of the measurement point P is corrected, the distance L between the running start position 5 and the arrangement position of the pressure sensor 3 remains the same.

Figure 5:
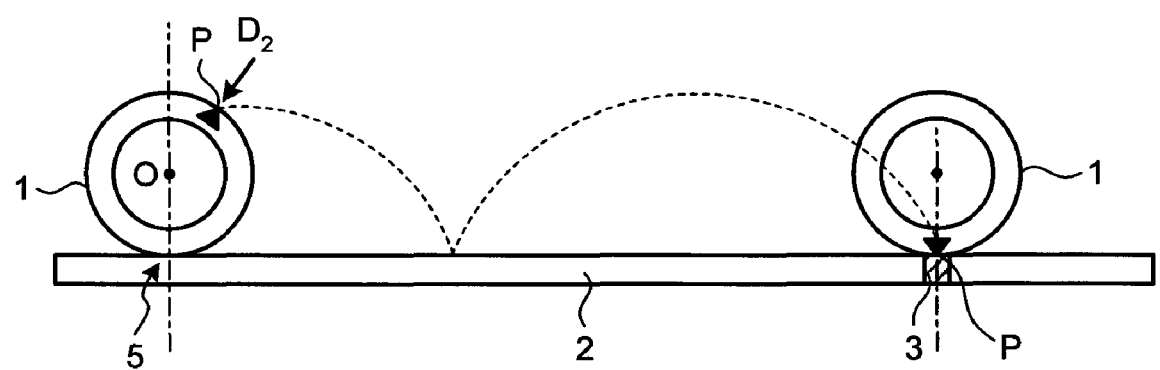
FIG. 5 is a diagram conceptually illustrating a main measurement.

After the correction of the rotation start position of the measurement point P, main measurement is performed. FIG. 5 is a conceptual diagram of the main measurement. As illustrated in FIG. 5, when the tire 1 is made to run from the corrected running start position 5 after the rotation start position of the measurement point P is corrected, the landing position of the measurement point P coincides with the position of the pressure sensor 3 as illustrated in FIG. 5, and the measurement point P surely contacts the pressure sensor 3. As a result, the ground contact pressure of the measurement point P can be measured by the pressure sensor 3 with high accuracy. In the conventional measurement method, the running distance from the running start position 5 to the pressure sensor 3 is different at the time of main measurement and at the time before the alignment process, resulting in an error in landing position of the measurement point P. In the present embodiment, the running distance L from the running start position 5 to the pressure sensor 3 at the main measurement does not change from the running distance L at the time of preliminary measurement. Therefore, the measurement point P of the tire 1 can reach the pressure sensor 3 with enhanced accuracy.

The tire performance measurement apparatus 10A adopting the above-described method is described below in detail with reference to FIG. 1. The tire performance measurement apparatus 10A includes, for correcting the rotation start position of the measurement point P of the tire 1, the tire-rotation-angle sensor 11, a tire-rotation-angle-difference calculating unit 12, and a rotation mechanism 13. The tire-rotation-angle sensor 11, the tire-rotation-angle-difference calculating unit 12 and the rotation mechanism 13 are controlled by a control unit 20 which controls the tire performance measurement apparatus 10A as a whole. The control unit 20 sets the running start position 5 and the reference position $D_1$ as the "initial position" of the tire 1. The control unit 20 drives the tire running device at the time of the preliminary measurement and the main measurement, to make the tire 1 set at the initial position to run toward the sensor 3.

The tire-rotation-angle sensor 11 detects the rotation angle of the tire 1 from the initial position. The tire-rotation-angle sensor 11 is arranged movable along the running of the tire 1. The tire-rotation-angle sensor 11 may be rotary encoder, hall element, or the like.

The tire-rotation-angle sensor 11 obtains the tire rotation angle $\theta_1$ when the rotation axis O of the tire 1 which starts running from the initial position passes over the pressure sensor 3 as illustrated in FIG. 3A, and the tire rotation angle $\theta_2$ when the measurement point P lands on the flat running board 2 as illustrated in FIG. 3B.

For example, when the reference position $D_1$ is on the line h connecting the running start position 5 and the rotation axis O, the tire 1 rotates one and a half times until the measurement point P which starts moving from the reference position $D_1$ lands on the flat running board 2 as illustrated in FIG. 3B. Therefore, the tire rotation angle $\theta_2$ is 180°+360°. Further, the tire rotation angle $\theta_1$ by which the tire 1 rotates after starting rolling from the initial position until covering the distance L as illustrated in FIG. 3A is obtained by the tire-rotation-angle sensor 11. The fact that the tire 1 covers the distance L can be detected by a position detection sensor such as a proximity switch and a sequencer. In the above example, the tire rotation angle $\theta_2$ is geometrically found without the use of the tire-rotation-angle sensor 11. Alternatively, the tire rotation angle $\theta_2$ may be obtained by the tire-rotation-angle sensor 11.

The tire-rotation-angle-difference calculating unit 12 calculates the tire rotation angle difference $\theta(=\theta_2-\theta_1)$ based on the tire rotation angles $\theta_1$ and $\theta_2$ obtained as described above in the preliminary measurement. The tire-rotation-angle-difference calculating unit 12 is embedded in the control unit 20.

A method of obtaining the rotation angle difference θ is not limited to the method using the tire-rotation-angle sensor 11 mentioned above, and other elements and method can be employed.

The rotation mechanism 13 rotates the tire 1 according to signal(s) sent from the tire-rotation-angle-difference calculating unit 12. More specifically, the rotation mechanism 13 moves the measurement point P from the reference position $D_1$ to a position $D_2$ which is shifted from the reference position $D_1$ by θ by rotating the tire 1 around the rotation axis O by θ without changing the position of the tire 1 arranged at the running start position 5 in the X direction as illustrated in FIG. 4. For example, the rotation mechanism 13 rotates the tire 1 by θ while keeping the tire 1 in a floated state a predetermined distance away from the flat running board 2, and arranges the tire 1 on the running start position 5. As the rotation mechanism 13, a driving mechanism such as a servo motor is employed.

Figure 6:
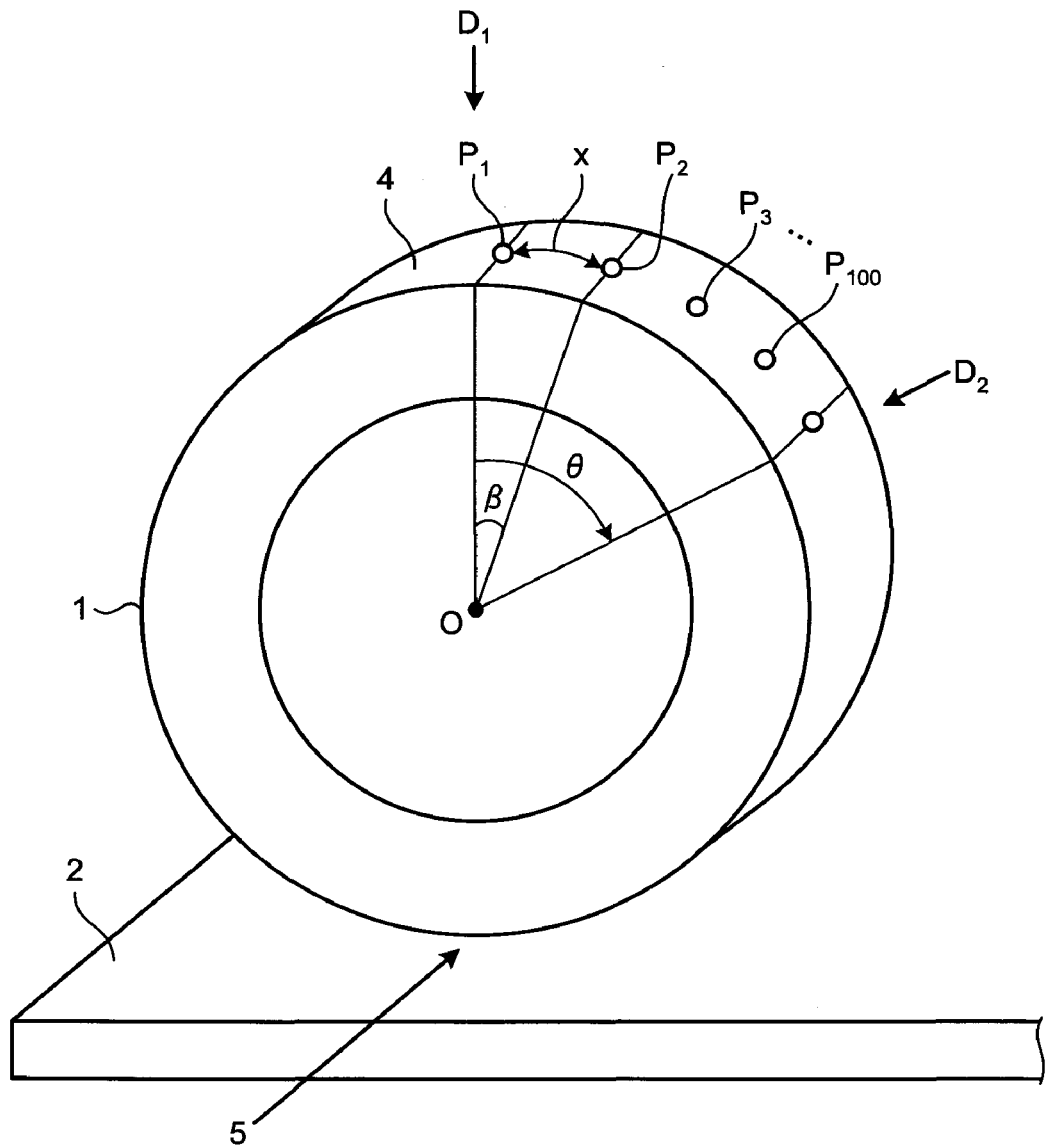
FIGS. 6 and 7 are conceptual diagrams for illustrating a correction of positions of measurement points.

Next, a case where more than one measurement point is set will be described. In FIG. 6, one hundred measurement points are set at predetermined positions on the tread surface 4 of the tire 1. The measurement points are referred to as $P_1, P_2, \ldots, P_{100}$, respectively. As in the case where only one measurement point P is set, the reference position $D_1$ is set near the surface of the tire 1 in order to specify the angle around the rotation axis O of the tire 1 arranged at the running start position 5. Then, the tire 1 is arranged at the running start position 5 with the measurement point $P_1$ set at the reference position $D_1$. The position of the tire 1 in this state will be referred to as "initial position" (first step). Firstly, the tire 1 is arranged at the running start position 5, the measurement point $P_1$ is set to the reference position $D_1$, and the preliminary measurement is performed to obtain the tire rotation angle difference θ (second step). Then the tire 1 is arranged again at the initial position, and rotated by θ without changing the position in the X direction. Thus, the measurement point $P_1$ is moved to the position $D_2$ which is shifted from the reference position $D_1$ by θ. Then, the main measurement is performed with the tire in this state. Thus, the ground contact pressure of the measurement point $P_1$ is measured (third step).

Next, the ground contact pressure of the measurement point $P_2$ is measured. At this time, the tire 1 is first arranged at the initial position. As illustrated in FIG. 6, an angle corresponding to the interval x between the measurement point $P_1$ and the measurement point $P_2$ in the tire circumferential direction is referred to as β. Then the measurement point $P_2$ is moved to $D_2$ by rotating the tire 1 by θ-β without changing the position of the tire 1 in the X direction. Here, the tire rotation angle difference θ obtained in the preliminary measurement with respect to the measurement point $P_1$ is common to all the measurement points $P_1$ to $P_{100}$. Hence, by rotating the tire 1 by θ-β without changing the position of the tire 1 in the X direction, the measurement point $P_2$ can be moved to $D_2$ (fourth step). When the tire 1 is made to run from this state, the landing point of the measurement point $P_2$ can be made to coincide with the position of the pressure sensor 3 in the same manner as the measurement point $P_1$. Hence, the ground contact pressure of the measurement point $P_2$ can be measured with high accuracy. Thereafter, the fourth step is repeated for each of the measurement points $P_3$ to $P_{100}$. Thus, even when many measurement points are set, the ground contact pressure at each of the measurement points can be measured with high accuracy and efficiency.

In the method mentioned above, the preliminary measurement is performed only once at the beginning. However, if there is a possibility of change in the rotation angle difference θ with respect to the measurement points $P_1$ to $P_{100}$, the preliminary measurement may be performed for all the measurement points $P_1$ to $P_{100}$.

In obtaining the angle β illustrated in FIG. 6 which corresponds to the interval x in the tire circumferential direction between the measurement point $P_1$ and the measurement point $P_2$ it is possible to use the expression β=x/R, where R is the radius R of the tire 1 obtained through actual measurement, or the dynamic loaded radius R obtained in consideration of the load applied to the tire 1. However, the radius R does not always correspond to the actual radius depending on various conditions such as the braking/driving force applied to the tire 1. Hence, when using the radius R, error might occur in the calculation of angle β. Hence, in the present embodiment, a method described below is employed.

Figure 7:
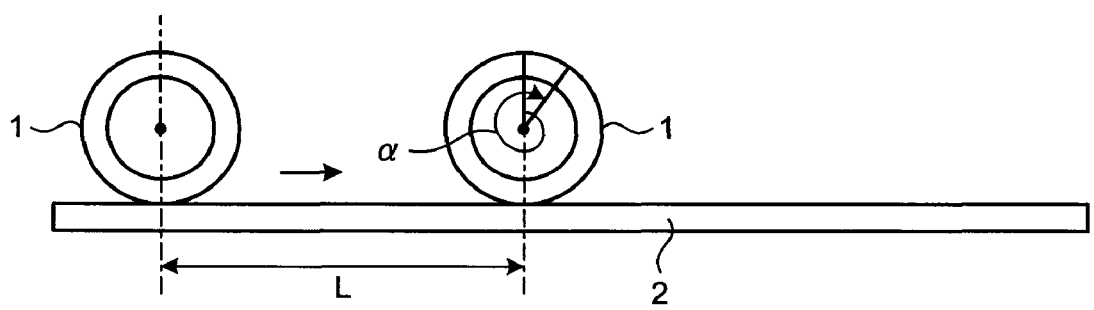

Firstly, as illustrated in FIG. 7, rotation angle α by which the tire 1 rotates while running the distance L is obtained. Here, the distance L is a distance the tire 1 runs while it rotates once, for example. The rotation angle α is measured by the tire-rotation-angle sensor 11 which is employed in the preliminary measurement. Then, the actual radius R' of the tire 1 during the tire running is obtained by the expression R'=L/α. The angle β corresponding to the interval x in the tire circumferential direction between the measurement point $P_1$ and the measurement point $P_2$ illustrated in FIG. 6 is obtained by the expression β=x/R'=α·x/L. By this method, the angle β can be obtained with high accuracy, and the measurement points $P_2$ to $P_{100}$ can be arranged at $D_2$ with high accuracy. Further, when the step for obtaining the radius R' is performed based on the preliminary measurement, the operation time can be shortened.

Figure 8:
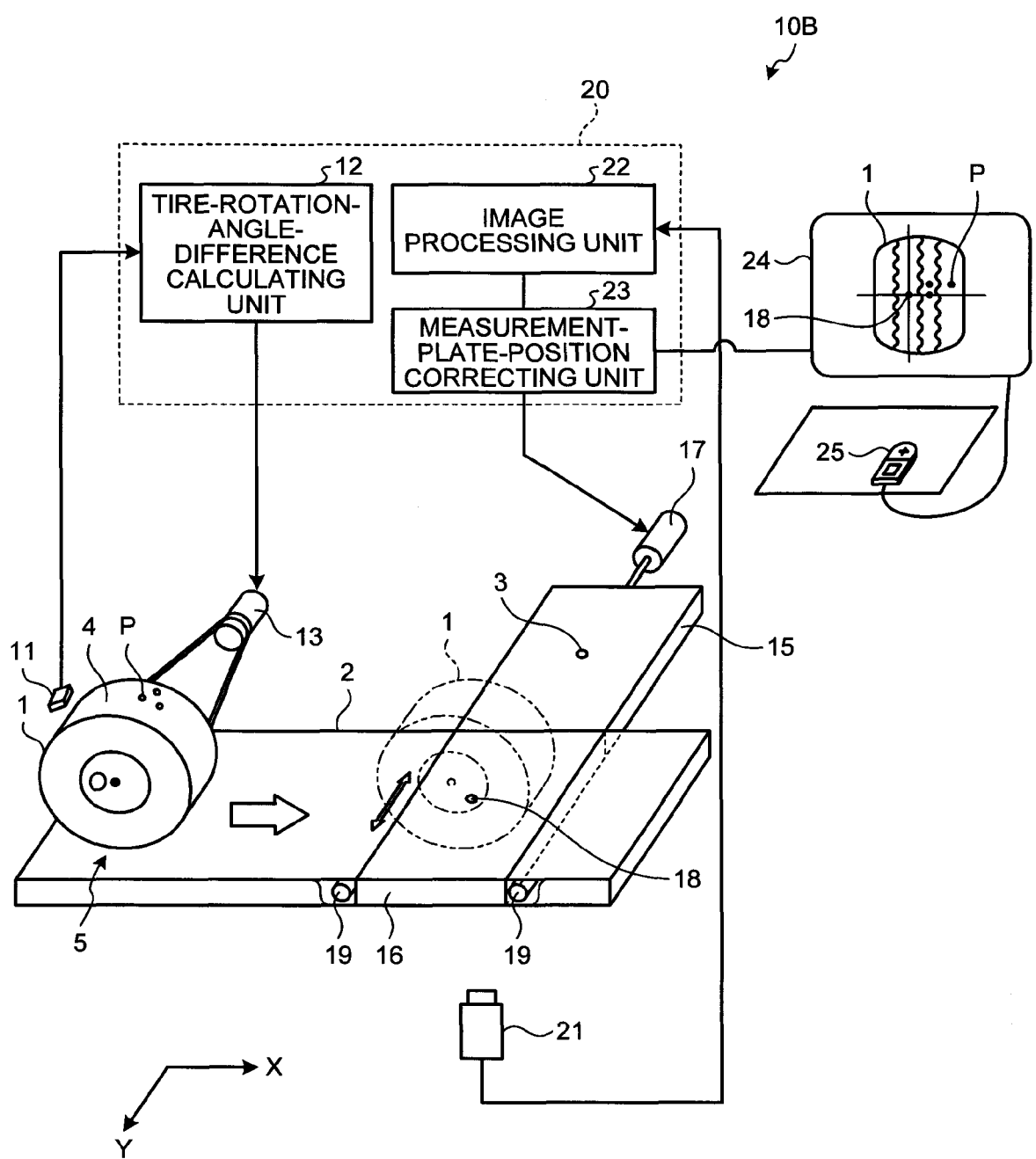
FIG. 8 is a schematic diagram of a configuration of a tire performance measurement apparatus according to an embodiment.

In the above example, the misalignment of the measurement point P with respect to the pressure sensor 3 in the X direction is corrected through the correction of the rotation start position of the measurement point P of the tire 1. The misalignment of the measurement point P with respect to the pressure sensor 3 in the Y direction may be corrected by an apparatus mentioned below. A tire performance measurement apparatus 10B illustrated in FIG. 8 includes, in addition to the unit for correcting the misalignment of the measurement point P in the X direction as illustrated in FIG. 1, a unit for correcting the misalignment of the measurement point P in the Y direction. As illustrated in FIG. 8, a measurement plate 15 is arranged movable in the Y direction in the middle of the flat running board 2. Further, a transparent plate 16 is connected to the side surface of the measurement plate 15 and extends in the Y direction from the side surface of the measurement plate 15. A servo motor 17 serves to place the measurement plate 15 and the transparent plate 16 alternately at the position corresponding to the flat running board 2. In the central portion of the measurement plate 15, the pressure sensor 3 is embedded. In the transparent plate 16, a reference-point mark 18 is formed at a position corresponding to the arrangement position of the pressure sensor 3.

On both sides of the transparent plate 16, illuminating units 19 are arranged. Right below the transparent plate 16, a camera 21 is arranged for photographing. The camera 21 takes an image of the ground contact surface of the tire 1 via the transparent plate 16, and the image processed by the image processing unit 22 is displayed on a display unit 24. The display unit 24 displays the measurement point P of the tire 1 and the reference-point mark 18 on the transparent plate 16. A digitizer 25 reads out the misalignment of the measurement point P with respect to the reference-point mark 18 in the Y direction on the display screen. The image processing unit 22 and a measurement-plate-position correcting unit 23 are incorporated in the control unit 20 together with the tire-rotation-angle-difference calculating unit 12.

Next, procedures for aligning the tire 1 using the tire performance measurement apparatus 10B illustrated in FIG. 8 will be described. Firstly, the tread surface 4 of the tire 1 is marked with the chalk, colorant, or the like to indicate the measurement point P, and the tire 1 is arranged at the initial position. The transparent plate 16 is arranged on the flat running board 2, and the measurement plate 15 is retracted. In the preliminary measurement, the control unit 20 causes the tire 1 to run from the initial position toward the transparent plate 16. Then the tire rotation angle $θ_1$ by which the tire 1 rotates until the rotation axis O of the tire 1 passes over the reference-point mark 18 of the transparent plate 16 and the tire rotation angle $θ_2$ by which the tire 1 rotates until the measurement point P lands on the flat running board 2 (or the transparent plate 16) are obtained with the use of the tire-rotation-angle sensor 11. Then, θ, i.e., a difference between $θ_1$ and $θ_2$ is obtained. In parallel to this process, the control unit 20 causes the camera 21 to take an image of the ground contact surface of the tire 1 when the measurement point P passes through the transparent plate 16 and causes the display unit 24 to display the image. Further, the control unit 20 reads out the shift amount Δy in the Y coordinate of the measurement point P with respect to the reference-point mark 18 using the digitizer 25, and sends a shift signal to the measurement-plate-position correcting unit 23.

Next, the tire 1 is brought back to the initial position, and the position of the measurement point P is corrected in the X and the Y directions. The control unit 20 moves the measurement point P from the reference position $D_1$ to the position $D_2$ by driving the rotation mechanism 13 and rotating the tire 1 by the angle θ without changing the position of the tire 1 in the x direction (see FIG. 4). In parallel to this process, the control unit 20 drives the servo motor using the measurement-plate-position correcting unit 23 to switch the positions of the transparent plate 16 and the measurement plate 15 to arrange the measurement plate 15 to the flat running board 2 and move the measurement plate 15 in the Y direction by the shift amount Δy. Thus, the correction of the position of the measurement point P in the X and the Y directions is finished. Thereafter, when the tire 1 is made to run from the initial position, the ground contact position of the measurement point P coincides with the position of the pressure sensor 3. Thus, the ground contact pressure of the measurement point P can be measured with high accuracy using the pressure sensor 3.

As described above, the tire performance measurement method and the tire performance measurement apparatus 10A/10B according to the present embodiment can enhance the accuracy with which the measurement point P of the tire 1 reaches the pressure sensor 3 in the main running because the running distance L from the running start position 5 to the pressure sensor 3 in the main running is the same with the running distance L at the time of preliminary measurement. As a result, the measurement accuracy of the ground contact pressure of the tire 1 can be improved in comparison with those achieved by the conventional method and apparatus.

In the above description of the present embodiment, an example where the ground contact pressure of the tire 1 is measured by the pressure sensor 3 is explained. Also in the measurement of the shear stress which is applied to the measurement point P when the measurement point P on the tread surface 4 lands, or in the measurement of the amount of skidding at the measurement point P, the method as described above can be performed with the accuracy of measurement being enhanced.

In the present embodiment, only the ground contact pressure of the tire 1 is measured with the use of the pressure sensor 3. Alternatively, two or more parameters may be measured simultaneously with the use of one sensor. The parameters to be measured include ground contact pressure, shear stress, and skidding amount.

Further, in the present embodiment, the sensor is incorporated in the flat running board 2. Alternatively, the sensor may be arranged in an element other than the flat running board 2 or on a general road surface.

As described above, the tire performance measurement method and the tire performance measurement apparatus according to the present invention are useful for alignment process for matching the measurement point of a tire and the position of a sensor in the measurements of the ground contact pressure, shear stress, and amount of skidding of the tire.

According to one embodiment, the running distance from the running start position to the sensor in the main running is the same as the running distance at the time of preliminary running. Therefore, the accuracy with which the measurement point of the tire reaches the sensor can be enhanced. As a result, the measurement accuracy of the ground contact pressure, shear stress, and amount of skidding of the tire can be improved in comparison with those achieved by the conventional method and apparatus.

According to the tire performance measurement method of one embodiment, even when many measurement points are set, it is sufficient if the rotation angle difference θ of one measurement point is obtained in the preliminary measurement. For other measurement points, the fourth step is sufficient. As a result, the ground contact pressure, shear stress, and amount of skidding of many measurement points can be measured with high accuracy and efficiency.

According to the tire performance measurement method of one embodiment, the angle β can be obtained with high accuracy. Therefore, the ground contact pressure, shear stress, and amount of skidding of many measurement points can be measured with high accuracy.

According to the tire performance measurement apparatus of one embodiment, the running distance from the running start position to the sensor in the main running is the same as the running distance in the preliminary running. Therefore, the accuracy with which the measurement point of the tire reaches the sensor can be enhanced. As a result, the measurement accuracy of the ground contact pressure, shear stress, and amount of skidding of the tire can be improved in comparison with those achieved by the conventional apparatus.

According to the tire performance measurement method and the tire performance measurement apparatus according to one embodiment of the present invention, the accuracy with which the measurement point of the tire reaches the sensor on the road surface can be enhanced. Therefore, the measurement accuracy of the ground contact pressure, shear stress, and amount of skidding of the tire can be improved in comparison with those achieved by the conventional method and apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A tire performance measurement method for detecting at least one of ground contact pressure, shear stress and amount of skidding at a measurement point on a tread surface of a tire by a sensor by rotating the tire on a road surface and causing the measurement point to contact the sensor arranged on the road surface, the method comprising:

setting an initial position of the tire, the initial position being a position where the measurement point is at a previously-set reference position and the tire is at a running start position on the road surface;

causing the tire to run from the initial position to obtain a rotation angle difference θ between a tire rotation angle by which the tire rotates until the rotation axis of the tire passes over the arrangement position of the sensor and a tire rotation angle by which the tire rotates until the measurement point contacts the road surface; and setting the tire at the initial position again to rotate the tire by the angle θ without changing the running start position of the tire, and causing the tire to run from the set state to measure at least one of the ground contact pressure, shear stress, and amount of skidding.

2. A tire performance measurement method for detecting at least one of ground contact pressure, shear stress, and amount of skidding at a plurality of measurement points on a tread surface of a tire by a sensor by rotating the tire on a road surface and causing the plurality of measurement points to contact the sensor arranged on the road surface, the method comprising:

a first step of setting an initial position of the tire, the initial position being a position where a first measurement point among the plurality of measurement points is at a previously-set reference position and the tire is at a running start position on the road surface;

a second step of causing the tire to run from the initial position to obtain a rotation angle difference $\theta$ between a tire rotation angle by which the tire rotates until the rotation axis of the tire passes over the arrangement position of the sensor and a tire rotation angle by which the tire rotates until the first measurement point contacts the road surface;

a third step of setting the tire at the initial position again to rotate the tire by the angle $\theta$ without changing the running start position of the tire, and causing the tire to run from the set state to measure at least one of the ground contact pressure, shear stress, and amount of skidding with respect to the first measurement point; and a fourth step of setting the tire at the initial position again, rotating the tire by an angle $\theta-\beta$ without changing the running start position of the tire, $\beta$ being an angle corresponding to an interval x in a tire circumferential direction between the first measurement point and another measurement point among the plurality of measurement points, and causing the tire to run from this state to measure at least one of the ground contact pressure, shear stress and skidding amount with respect to the another measurement point, wherein the fourth step is performed with respect to all the measurement points other than the first measurement point.

3. The tire performance measurement method according to claim 2, wherein the angle $\beta$ is obtained based on an expression $\beta=\alpha x/L$, $\alpha$ being a rotation angle of the tire by which the tire rotates when running from the running start position to cover a distance L.

4. A tire performance measurement apparatus for detecting at least one of ground contact pressure, shear stress, and amount of skidding at a measurement point on a tread surface of a tire by a sensor arranged on a road surface by causing the tire to rotate on the road surface to cause the measurement point to contact the sensor, the apparatus comprising:

a control unit that sets an initial position of the tire, the initial position being a position where the measurement point is at a previously-set reference position and the tire is at a running start position on the road surface;

a rotation-angle-difference calculating unit that obtains a rotation angle difference $\theta$ between a tire rotation angle by which the tire rotates when running from an initial position until a rotation axis of the tire passes over an arrangement position of the sensor and a tire rotation angle by which the tire rotates when running from the initial position until the measurement point contacts the road surface; and a rotation mechanism that rotates the tire by the angle $\theta$ without changing the running start position of the tire arranged at the initial position, wherein the at least one of the ground contact pressure, shear stress and the amount of skidding is measured by causing the tire to run from the state after the tire is rotated by the rotation mechanism.

* * * * *

UNITED STATES PATENT AND TRADEMARK OFFICE
CERTIFICATE OF CORRECTION

PATENT NO. : 8,397,558 B2
APPLICATION NO. : 13/178979
DATED : March 19, 2013
INVENTOR(S) : Noritaka Koguchi et al.

It is certified that error appears in the above-identified patent and that said Letters Patent is hereby corrected as shown below:

On the Title Page:

Delete "(73) Assignee: The Yokohama Rubber Co., Ltd., Tokyo (JP)" and replace with --(73) Assignees: The Yokohama Rubber Co., Ltd., Tokyo (JP); Kabushiki Kiasha Kobe Seiko Sho, Hyogo (JP)--.

Signed and Sealed this
Fifteenth Day of October, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,397,558 B2  
APPLICATION NO. : 13/178979  
DATED : March 19, 2013  
INVENTOR(S) : Noritaka Koguchi et al.

Page 1 of 1

It is certified that error appears in the above-identified patent and that said Letters Patent is hereby corrected as shown below:

On the Title Page:

Delete "(73) Assignees: The Yokohama Rubber Co., Ltd., Tokyo (JP); Kabushiki Kiasha Kobe Seiko Sho, Hyogo (JP)" and insert --(73) Assignees: The Yokohama Rubber Co., Ltd., Tokyo (JP); Kabushiki Kaisha Kobe Seiko Sho, Hyogo (JP)--.

This certificate supersedes the Certificate of Correction issued October 15, 2013.

Signed and Sealed this
Twenty-fifth Day of February, 2014

Michelle K. Lee
*Deputy Director of the United States Patent and Trademark Office*